United States Patent
DeMoss et al.

(10) Patent No.: US 9,935,940 B1
(45) Date of Patent: Apr. 3, 2018

(54) PASSWORD SECURITY

(71) Applicant: Amazon Technologies, Inc., Reno, NV (US)

(72) Inventors: Matthew Daniel DeMoss, Falls Church, VA (US); Gregory Branchek Roth, Seattle, WA (US); Andrew Paul Mikulski, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 397 days.

(21) Appl. No.: 14/481,798

(22) Filed: Sep. 9, 2014

(51) Int. Cl.
*H04L 29/06* (2006.01)
*G06F 17/30* (2006.01)

(52) U.S. Cl.
CPC ...... *H04L 63/083* (2013.01); *G06F 17/30864* (2013.01); *H04L 63/20* (2013.01)

(58) Field of Classification Search
CPC .. H04L 63/083; H04L 63/20; G06F 17/30864
See application file for complete search history.

(56) References Cited

U.S. PATENT DOCUMENTS

| | | | | |
|---|---|---|---|---|
| 6,226,745 B1 * | 5/2001 | Wiederhold | ........ | G06F 21/6218 707/999.009 |
| 7,558,796 B1 * | 7/2009 | Bromwich | ........ | G06F 17/30386 |
| 8,453,222 B1 * | 5/2013 | Newstadt | ........... | H04L 63/083 726/4 |
| 2002/0078350 A1 * | 6/2002 | Sandhu | ........ | G06F 21/46 713/168 |
| 2006/0075230 A1 * | 4/2006 | Baird, III | .......... | H04L 63/083 713/168 |
| 2008/0313721 A1 * | 12/2008 | Corella | ........... | H04L 9/3226 726/6 |
| 2010/0180327 A1 * | 7/2010 | Sheets | .......... | H04L 9/3226 726/6 |
| 2011/0185419 A1 * | 7/2011 | Boteler | ......... | H04L 63/1425 726/22 |
| 2015/0350186 A1 * | 12/2015 | Chan | .......... | H04L 63/083 726/9 |

OTHER PUBLICATIONS

Habets, Thomas; https://github.com/ThomasHabets/yhsmpam; GitHub, Inc.; Copyright 2014; accessed Oct. 28, 2014; 2 pages.

* cited by examiner

*Primary Examiner* — Tri Tran

(74) *Attorney, Agent, or Firm* — Baker & Hostetler LLP

(57) ABSTRACT

Techniques are disclosed for increasing the security of a database. A database is coupled with an access manager to limit certain applications that use the database to store user password information to queries that return at most one row. Additionally, returning a record may be limited to a case where the query includes the hash of the user name and password that is stored in the database. Other techniques may be implemented for other user account operations, such as password resets.

20 Claims, 12 Drawing Sheets

US 9,935,940 B1

PASSWORD SECURITY

BACKGROUND

Some companies offer access to resources, like web-based applications, that are restricted based on user credentials. In interacting with these resources, a user may create a user name and password, attempt to access the resources by proffering his/her user name and password, and reset or change his/her password.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
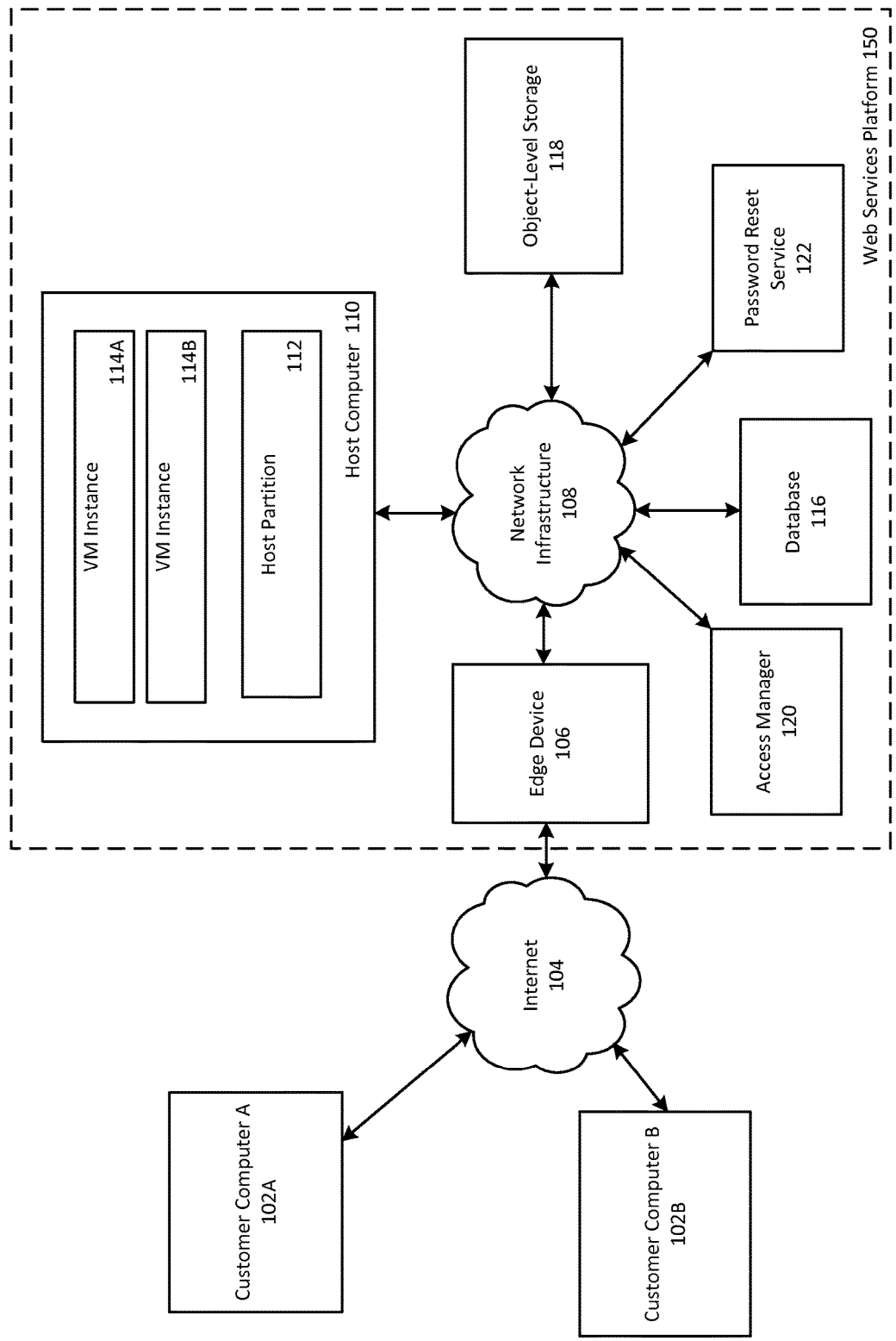
FIG. 1 depicts an example operating environment in which embodiments may be implemented.

Typically, user name and password credentials will be stored in a database so that, when a user provides credentials, those provided credentials may be checked against the database to see if they are part of a pre-existing account. In these databases, at least the password may be hashed—processed with a one-way function that computes the hash value from the password, but where performing the reverse process of computing the password from the hash is computationally difficult. Additionally, this hash function may be performed several times on the password, which increases the amount of computing resources that are devoted to each guess, since each guess must also then be hashed several times to see if it is correct. This hashing adds some degree of security because the passwords are not stored in plain text, so an attacker who gains access to the password database does not directly gain access to the passwords themselves. However, hashed passwords are still susceptible to offline attacks where the attacker downloads at least part of the password database, and then can spend a significant amount of time and attempts at guessing the correct password without the administrator of the database being aware that these attempts are being made.

Even if an attacker cannot download at least part of the password database, this database may still be susceptible to an online attack, where the attacker provides a large number of guesses to the database in series until he/she guesses the password correctly.

Returning to offline attacks, one way to mitigate these attacks is via a hardware security module (HSM)—typically a specialized physical device that maintains one or more keys used in a hashing or encryption operation (in addition to whatever physical device runs the corresponding application, like a general-purpose computing device), has circuitry configured to detect an attacker's tampering, and can possibly delete stored key(s) in response to detecting the tampering. Problems with HSMs include their relatively high cost, as well as their complexity, which makes configuring and maintaining one difficult.

These present techniques overcome these problems in the art by providing for a general-purpose database (such as versions of a DynamoDB database—a NoSQL database service) that has improved security. This database may be coupled with an access-control system that controls the access of specific types of queries to the database. Access to an application that uses the database for passwords may then be restricted to those queries that return at most one row—e.g., Get or Put queries—and not queries for scans that involve wildcards. This approach may mitigate the risk of offline attacks, since it is more difficult for an attacker to download a large portion of a password database, even if he/she compromises an application that queries the database. Additionally, queries to the database to fetch a row may require using a hash of the user name and password as an argument to that query, so one must know the password to be able to get any information from the database. Furthermore, the access-control system may enforce a limit on a rate of queries, and when the rate of queries is limited, an online attack is less likely to be successful.

There are other embodiments, as described below.

FIG. 1 depicts an example operating environment in which embodiments may be implemented to improve password security. Generally, the operating environment of FIG. 1 includes a multi-customer web services platform 150 that comprises multiple virtual machine instances executing on host computer 110 (the instances and host computers may both be described as being computing nodes, and there may be multiple instances of host computer 110), that may each execute one or more web applications that store user passwords in database 116. Access manager 120 may regulate the access of one or more web applications to make certain application programming interface (API) calls or queries to database 116. In embodiments, access manager 120 may comprise an access control component operable to inspect the query to determine whether the query is consistent with the policy, and to allow the query to proceed to the database where the query is consistent with the policy. Additionally, in embodiments, password reset service 122 serves as an intermediary between the web applications (not shown) and database 116 when it comes to resetting or changing a user's password.

In embodiments, customer computer A 102A and customer computer B 102B may be controlled by users that provide passwords to web applications executing on VM instance 114A or 114B. The web applications may then query database 116 to determine whether the password is correct for a particular user account, and this process may involve access manager 120 and password reset service 122 (in the case of resetting or changing passwords), as described below. Database 116 may be configured to enforce a different policy between two services that query the database so that each service may have its own set of access controls.

In embodiments, one or more of database 116, access manager 120, and password reset service 122 may be implemented on a VM instance, such as VM instance 114A. In embodiments, database 116 may implement all or some of the operating procedures depicted in FIGS. 4-9, and VM instance 114A or 114B may execute a web application that implements all or some of the operating procedures depicted in FIGS. 3 and 5.

Customer computer A 102A and customer computer B 102B are computers possessed by customers, which are configured to access the web services platform 150 via a public network, e.g., Internet 104. In turn, the connection point between the multi-customer web services platform 150 and Internet 104 is edge device 106. In embodiments, edge device 106 may be a gateway router. Within the multi-customer web services platform, edge device 106 connects to another computer network—network infrastructure 108. Network infrastructure 108 may be an intranet that is separate from Internet 104. Also connected to network infrastructure 108 are database 116, access manager 120, password reset service 122, object-level storage 118, and host computer 110.

As depicted, web services platform 150 comprises host computer 110, which is configured to execute one or more virtual machine instances 114 (depicted here as VM instance 114A and VM instance 114B) and a host partition 112. While host computer 110 is depicted here as executing two VM instances 114, it may be appreciated that host computer 110 may execute more or fewer VM instances.

In embodiments, a customer directs the multi-customer web services platform to execute one or more VM instances on the customer's behalf. These VM instances may then execute to perform functions for the customer, such as a function of a web server for the customer's web site or a web application that involves passwords, or to perform compute functions, such as encoding video.

In addition to this aspect of the web services platform, customers may also store data in object-level storage 118. Object-level storage 118 is depicted as storing data as objects (e.g., a customer instructs the web services platform to store or retrieve a specific file). It may be appreciated that there are embodiments where a block-level storage service is implemented instead of, or in addition to, object-level storage 118. Object-level storage 118 may also be used by other devices on the web services platform to store data. For example, as described in more detail herein below, database 116 may store logging and metrics information in object-level storage to use in determining whether an attack is occurring or has occurred.

Figure 2:
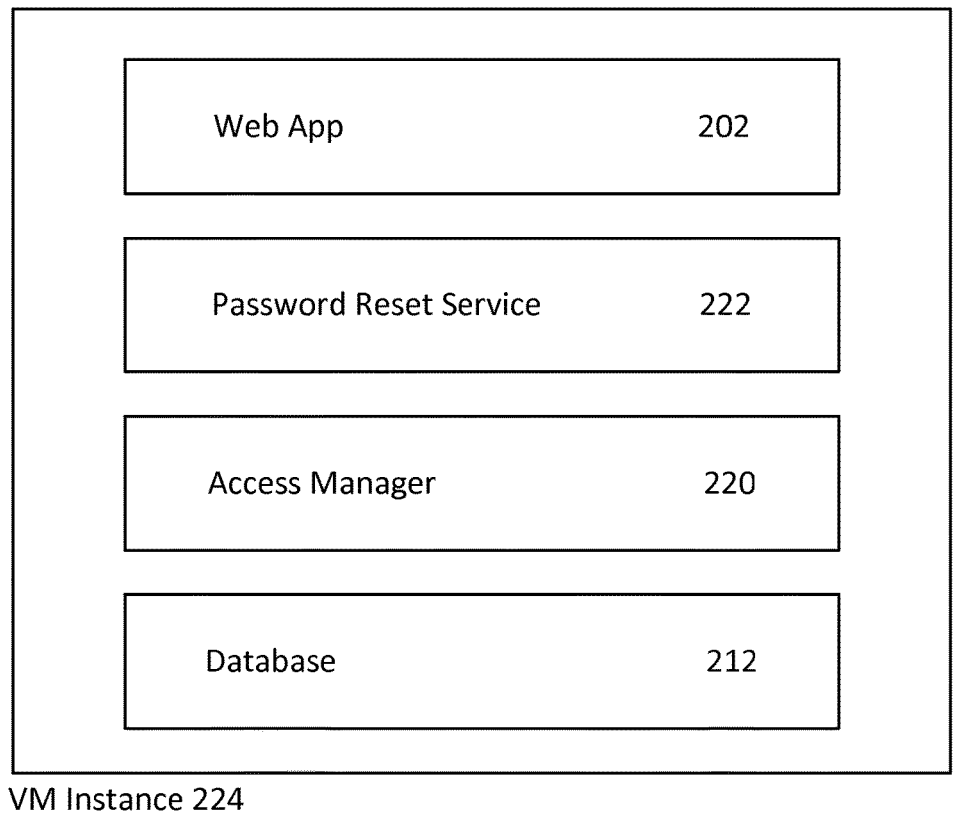
FIG. 2 depicts example operating procedures for a client and server, where an application on the server prints locally to the client.

FIG. 2 depicts an example embodiment of how an application, password reset service, access manager, and database may be implemented. As depicted, VM instance 224 (which may be similar to VM instance 114A of FIG. 1) may host all other components depicted in FIG. 2. These other components depicted in FIG. 2 are web application 202, password reset service 222 (which may be similar to password reset service 122 of FIG. 1), access manager 220 (which may be similar to access manager 120 of FIG. 1), and database 212 (which may be similar to database 116 of FIG. 1).

Where in FIG. 1 the components were depicted as being separate components that are connected through a communications network, here the components are contained within a single VM instance. Web application 202 originates access to resources by users that require user credentials (e.g., logging into the web application, creating an account for the web application, and resetting a password for the web application). In doing so, web application 202 may communicate with password reset service 222 and database 212, with access to database 212 governed by access manager 220 in a manner similarly described for similar communications in FIG. 1. However, in contrast to FIG. 1 where the components communicate across a communications network, here the components communicate within a VM instance via inter-process communication (IPC) techniques.

Figure 3:
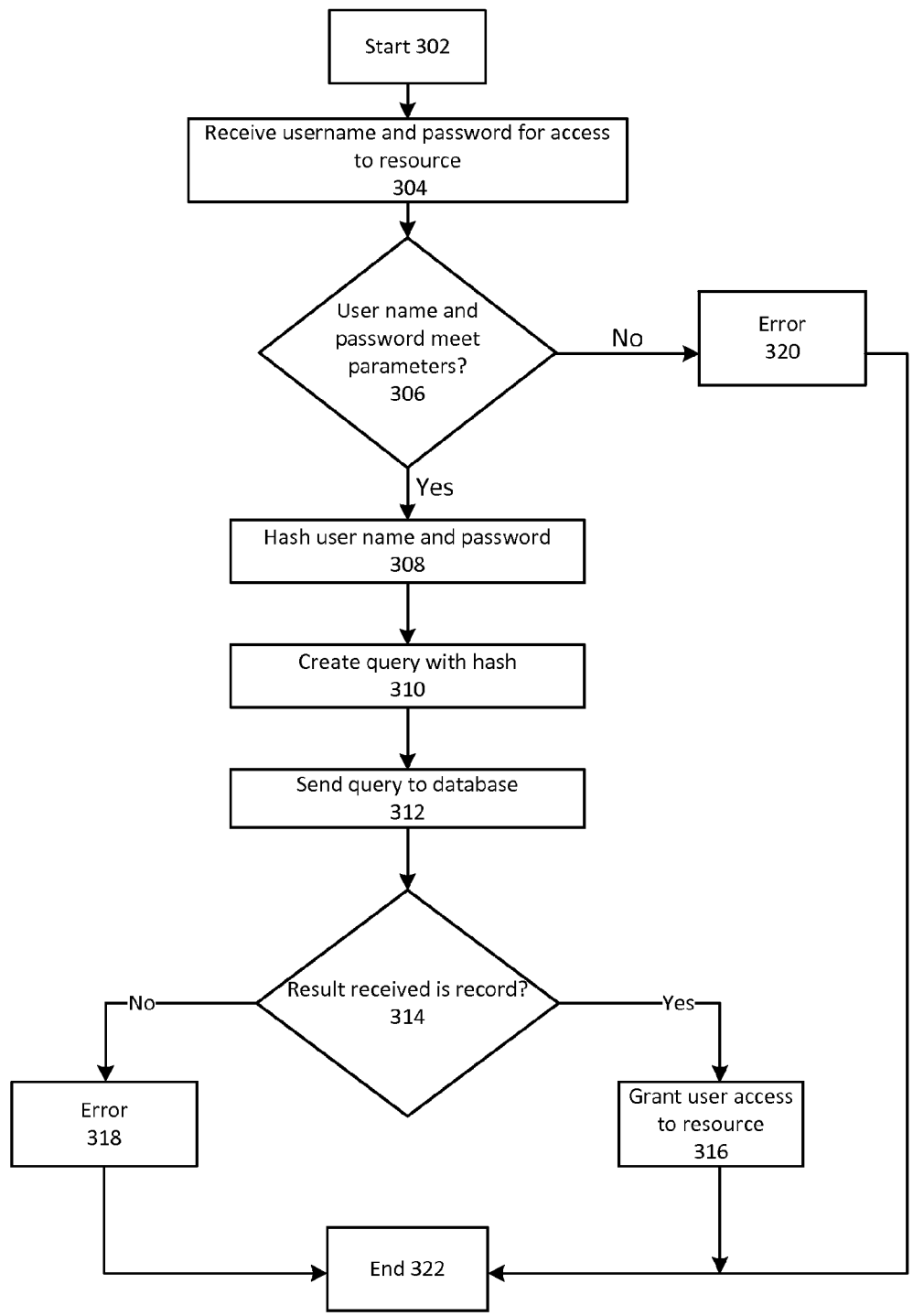
FIG. 3 depicts example operating procedures for a web application authorizing a user to access a resource.

FIG. 3 depicts example operating procedures for a web application authorizing a user to access a resource. In embodiments, the operating procedures of FIG. 3 may be implemented by a web application executing within VM instance 114A of FIG. 1 as it queries database 116 to determine whether the user has a valid password.

It may be appreciated that there are embodiments where the operating procedures of FIG. 3 (or FIGS. 4-9) are implemented in a different order than is depicted. For example, there may be embodiments where operation 308 occurs before operation 306. It may also be appreciated that there are embodiments that have more, or fewer, operating procedures than are depicted in FIG. 3 (or FIGS. 4-9). For example, there may be embodiments that omit operations 306 and 320, or that include an operation between operations 310 and 312—where the query is encrypted before it is sent to the database.

The operating procedures of FIG. 3 begin with operation 302 and move to operation 304. Operation 304 depicts receiving a user name and password for access to a resource. This may comprise customer computer A 102A displaying a web page associated with a web application of VM instance 114A, and then receiving user input at the local console session indicative of a user name and password entered into one or more fields of the web page. Then, customer computer A 102A may send this information to VM instance 114A across Internet 104. In embodiments, operation 304 may comprise receiving a user name and password indicative of attempting to log into a resource. In embodiments, operation 304 may comprise receiving, by the web application, the user name and password from a remote computer across a communications network, the remote computer providing the user name and password as part of an attempt to log into the web application.

In embodiments, the database may be associated with a policy (such as one set by a customer of a service provider that uses the database to store user names and passwords), where the policy is configured with respect to database queries such that database queries are allowed where they uniquely identify one result or no results. That is, a query operation may identify only one result based on the specifics of the query and the data contained in the database, but it is still possible for a query with a wildcard operation to return more than one result. Here, the policy may be that queries are allowed only where they are capable of identifying exactly one row or result, or no results at all, which would exclude queries with wildcard operations (or, e.g., scans). After operation 304, the operating procedures of FIG. 3 move to operation 314.

Operation 306 depicts determining whether the user name and password meet the required parameters. This may be different than actually determining whether there is an account for that user name and password combination. It may be that there are certain requirements for user names and passwords (e.g., a user name must be at least three characters long and include no special characters, or a password must contain at least one capital letter and one digit) and that the web application may perform a first level of determining whether the user name and password meet these required parameters before spending the computing resources involved with querying the database to determine whether the user name and password are correct. Where it is determined in operation 306 that the user name and the password do meet the required parameters, the operating procedures of FIG. 3 move to operation 308. Instead, where it is determined in operation 306 that the user name and password do not meet the required parameters, the operating procedures of FIG. 3 move to operation 320.

Operation 308 is reached where it is determined in operation 306 that the user name and the password do meet the required parameters. Operation depicts hashing the user name and password to generate a hash. As described above, this may comprise performing a one-way function that uses the user name and password as input to produce a hash. A similar hash of user names and passwords may be stored in the database as keys to rows, so that, if the user name and password are correct, they will be transformed into a value that is the same as a key in the database, and then, when provided to the database in the form of a query, will identify a row.

In embodiments, generating a hash may also be based on a secret—an additional piece of data that is generally not known to other entities. A secret may be used where multiple applications use the same database for password storage, so even if there are two identical user name and password pairs between two applications that use the same database, each application will use a different secret in generating its respective hash, so the hashes for the user name and password pairs will be different, and there will not be multiple rows in the same database that use the same key (or two different applications attempting to operate upon the same row in the database).

In other embodiments, other techniques may be performed on the user name and the password instead of a hash. For instance, in other embodiments, a cipher block chaining message authentication code (CBC-MAC) technique may be performed on the user name and password instead of the hash. After operation 308, the operating procedures of FIG. 3 move to operation 310.

Operation 310 depicts creating a query with the hash. This may comprise determining to form a Get query (a query to retrieve one row, based on that row having the same key as a parameter provided in the query, such as a MySQL Select query that omits a wildcard) based on the context of the web application—for instance, the user may provide a user name and password in the course of attempting to log into the web application. The web application may further form the query by using the hash generated in operation 308 as the parameter for the query. In embodiments, operation 310 may comprise constructing a database query to look up an entry in a database, the database query including an indication of the hash as a query term. After operation 310, the operating procedures of FIG. 3 move to operation 312.

Operation 312 depicts sending the query to the database. In embodiments, this may comprise the web application sending database 116 a query over network infrastructure 108. In embodiments, operation 312 may comprise sending the query to the database, the database enforcing a policy that restricts lookup access to a lookup of one item per query. After operation 312, the operating procedures of FIG. 3 move to operation 306.

Operation 314 depicts determining whether the result received from the database indicates a record in the database. In example embodiments, the policy is evaluated to determine whether the query uniquely identifies one or no results. In embodiments, when the query term (e.g., the hashed user name and password from operation 308) matches the key to a row of the database, the database may return an indication of this. For example, the database may return that row to the application that originated the query. In other embodiments, the database may return an indication that the query term did match a key in the database without returning the row that corresponds to that key. In embodiments where the query term does not match a key in the database, the result may give an indication that no matching records were found. In embodiments, operation 314 may comprise receiving a response from the database that indicates whether the database contains a row that uses the hash as a key for the row, and determining that the user name and password are valid when the response from the database indicates that the database contains a row that uses the hash as the key for the row. This may also comprise determining that the user name and password are invalid when the response from the database indicates that the database lacks a row that uses the hash as the key for the row. Where it is determined in operation 314 that the result received from the database indicates a record in the database, the operating procedures of FIG. 3 move to operation 316. Instead, where it is determined in operation 314 that the result received from the database does not indicate a record in the database, the operating procedures of FIG. 3 move to operation 318.

Operation 316 is reached where it is determined in operation 314 that the result received from the database indicates a record in the database. Operation 316 depicts granting the user access to the requested resource. For example, where the user is attempting to log into a web application, such as an email service or an online video service, granting the user access to the requested resource may involve allowing the user to access and use the service. In embodiments, operation 316 may comprise providing access to the resource in response to determining that the user name and password are valid. In embodiments, this may comprise providing an indication that access to a resource is to be allowed so that another entity may grant access (e.g., sending an indication via a communications network to that entity). After operation 316, the operating procedures of FIG. 3 move to operation 322, where the operating procedures of FIG. 3 end.

Operation 318 is reached where it is determined in operation 314 that the result received from the database does not indicate a record in the database. Operation 318 depicts raising an error. For example, raising an error here may comprise sending customer computer A 102A an indication that the login attempt failed, where customer computer A 102A then displays a "login attempt failed" message in a user interface of a display. In embodiments, operation 318 may comprise denying access to the resource in response to determining that the user name and password are invalid. After operation 318, the operating procedures of FIG. 3 move to operation 322, where the operating procedures of FIG. 3 end.

Operation 320 is reached where it is determined in operation 306 that the user name and password do not meet required parameters. Operation 320 depicts raising an error. For example, raising an error here may comprise sending customer computer A 102A an indication that the login attempt failed, where customer computer A 102A then displays a "login attempt failed" message in a user interface of a display. In other embodiments, the message may specify that either the user name or the password entered do not meet the basic parameters for the system. After operation 320, the operating procedures of FIG. 3 move to operation 322, where the operating procedures of FIG. 3 end.

Figure 4:
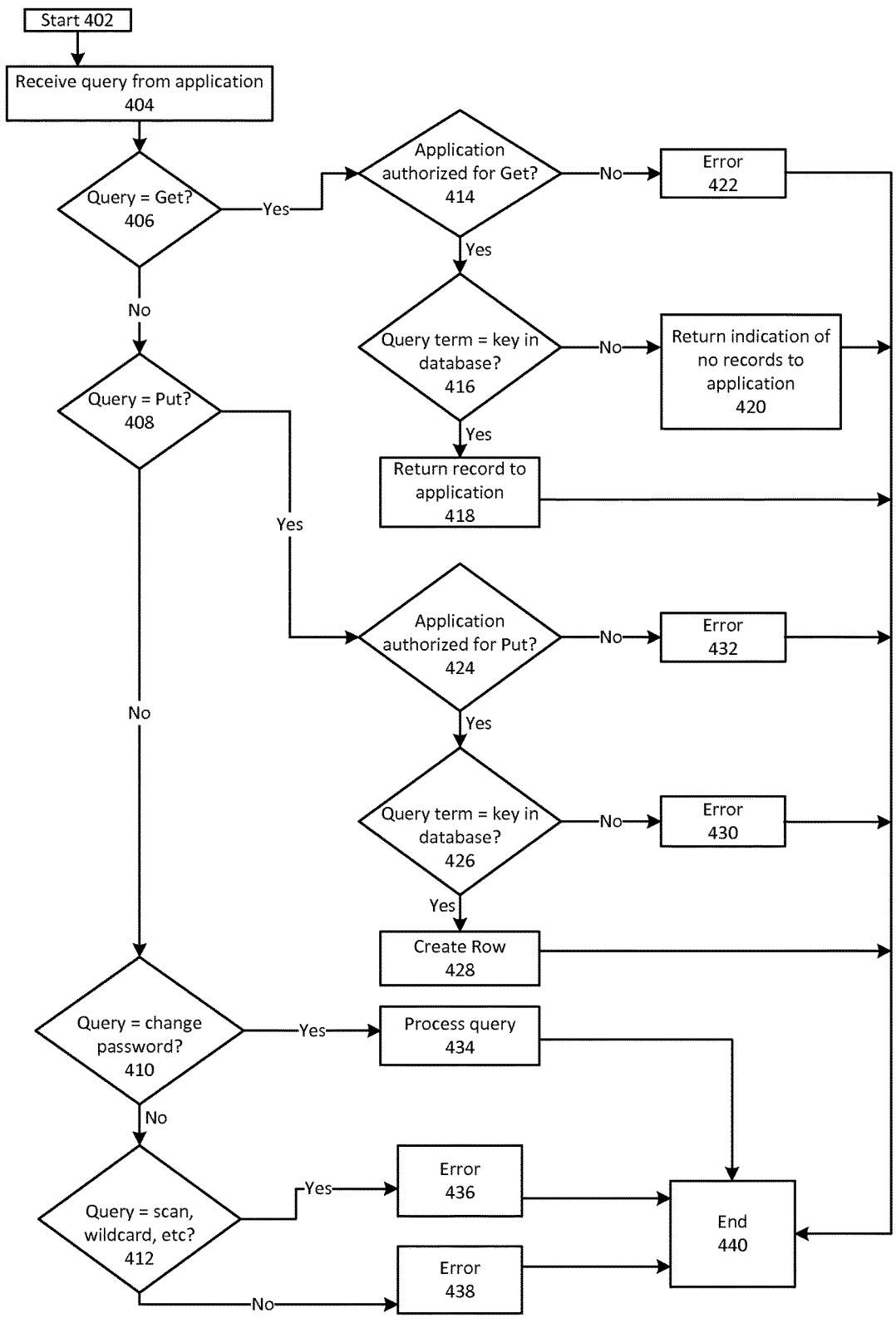
FIG. 4 depicts example operating procedures for a database processing a query received from an application.

FIG. 4 depicts example operating procedures for a database processing a query received from an application. In embodiments, the operating procedures of FIG. 4 may be implemented by database 116 of FIG. 1 as it receives queries from VM instance 114A and consults with the policy associated with the database as described for example in the operating procedures of FIG. 3. As used herein, certain operations are described as being performed by a database. It may be appreciated that these operations may be performed by a database management system (DBMS) configured to control a database, or by another computing node or process configured to control the database.

The operating procedures of FIG. 4 begin with operation 402 and move to operation 404. Operation 404 depicts receiving a query from an application. This may comprise VM instance 114A sending a query (such as the query described in operation 310 of FIG. 3) to the database across network infrastructure 108. After operation 404, the operating procedures of FIG. 4 move to operation 406.

Operation 406 depicts determining whether the query is a Get query. As used herein, a Get query may be a query to access a single row of a database by providing a key to that row as a query term, and may be used by a web application to determine whether a user name and password are correct. In embodiments, each key in a table of the database that the query operates on may be unique, so that providing one key results in identifying at most one row. Such a Get query may take the form of a high-level query language of "Get(key)," where "Get" identifies that the query is a Get query and "key" is a value to identify a row within a database table that is to be retrieved. Where it is determined in operation 406 that the query is a Get query, the operating procedures of FIG. 4 move to operation 414. Instead, where it is determined in operation 406 that the query is not a Get query, the operating procedures of FIG. 4 move to operation 408.

Operation 408 is reached where it is determined in operation 406 that the query is not a Get query. Operation 408 depicts determining if the query is a Put query. As used herein, a Put query may be a query to add a single row to a database (and not read any information from the database), and may be used to create a new user account for a web application. A Put query may include arguments that identify the user name and password for the new account. In embodiments, the argument to a Put query may be a hashed user name and password as described in operation 308 of FIG. 3. This hash may be used by the database to create a new row with that hash as a key, which may be sufficient to identify that there is a user account that corresponds to that hash, and verify whether a proffered user name and password matches that hash. An example Put query may take the form of a high-level query language of "Put(key)," where "Put" identifies that the query is a Put query and "key" is a value to use to create a new row in the database with the value of "key" being used as the key for that row. Where it is determined in operation 408 that the query is a Put query, the operating procedures of FIG. 4 move to operation 424. Instead, where it is determined in operation 408 that the query is not a Put query, the operating procedures of FIG. 4 move to operation 410.

Operation 410 is reached where it is determined in operation 408 that the query is not a Put query. Operation 410 depicts determining if the query is a query to change a password. For example, a query to change a password may take the form of a high-level query language of "Update (oldkey, newkey)," where "Update" identifies that the query is a query to change a password, "oldkey" identifies a key to the current row, and "newkey" identifies a new value for the key for that row. Where it is determined in operation 410 that the query is a query to change a password, the operating procedures of FIG. 4 move to operation 434. Instead, where it is determined in operation 410 that the query is not a query to change a password, the operating procedures of FIG. 4 move to operation 412.

Operation 412 is reached where it is determined in operation 410 that the query is not a query to change a password. Operation 412 depicts determining if the query is a query to access a plurality of rows. A query to access a plurality of rows may be a query that itself is configured to access a plurality of rows, such as a query to access all rows in the database, or a query that uses a wildcard as an argument, such that matching the wildcard would result in matching a plurality of rows. For example, the query Get(*) may be a query in high-level query language to get every row (since the wildcard "*" identifies all keys when supplied as the argument to a Get query). Where it is determined in operation 412 that the query is a query to access a plurality of rows, the operating procedures of FIG. 4 move to operation 436. Instead, where it is determined in operation 412 that the query is not a query to access a plurality of rows, the operating procedures of FIG. 4 move to operation 438.

Operation 414 is reached from operation 406, where it is determined in operation 406 that the query is a Get query. Operation 414 depicts determining whether the application is authorized for Get queries. In embodiments, this may comprise database 116 communicating with access manager 120 to determine whether the web application that originated the query is authorized to make Get queries on the database or on a particular table or row within the database. Where it is determined in operation 414 that the application is authorized for Get queries, the operating procedures of FIG. 4 move to operation 416. Where it is determined in operation 414 that the application is not authorized for Get queries, the operating procedures of FIG. 4 move to operation 422.

Operation 416 is reached from operation 414 where it is determined in operation 414 that the application is authorized for Get queries. Operation 416 depicts determining whether the query term identifies a key in the database. For example, where the database comprises a plurality of key-value pairs, this may comprise determining whether the string or data in the query term is identical to the string or data in any key of the key-value pairs of the database (or a particular table or set of rows in the database, where a particular web application's password storage is confined to a particular table or set of rows). Where it is determined in operation 416 that the query term identifies a key in the database, the operating procedures of FIG. 4 move to operation 418. Where it is determined in operation 414 that the query term does not identify a key in the database, the operating procedures of FIG. 4 move to operation 420.

Operation 418 is reached from operation 416, where it is determined in operation 416 that the query term identifies a key in the database. Operation 418 depicts returning a record associated with the key in the database to the application. In embodiments, this may comprise returning the entire record or row associated with the key. For example, continuing with the example where the database comprises a plurality of key-value pairs, this may comprise returning the identified key-value pair to the application. In other embodiments, this may comprise returning a subset of the record or row to the application, such as just the key or just the value in the key-value pair, or returning an identification that there is a matching row or record in the database. After operation 418, the operating procedures of FIG. 4 move to operation 440, where the operating procedures of FIG. 4 end.

Operation 420 is reached from operation 416, where it is determined in operation 416 that the query term does not identify a key in the database. Operation 420 depicts returning an indication that there are no records matching the query term to the application, which may be that there are no rows that use the query term as a key to that row. For example, where in operation 418, returning an indication that there is a matching record may comprise returning the Boolean TRUE, here, returning an indication that there are no records matching the query term may comprise returning the Boolean FALSE to the application. After operation 420, the operating procedures of FIG. 4 move to operation 440, where the operating procedures of FIG. 4 end.

Operation 422 is reached from operation 414, where it is determined in operation 414 that the application is not authorized for Get queries. Operation 422 depicts raising an error. This may comprise returning to the application an indication that it is not authorized for Get queries, and logging the attempted query, such as in object-level storage 118. After operation 422, the operating procedures of FIG. 4 move to operation 440, where the operating procedures of FIG. 4 end.

Operation 424 is reached from operation 408, where it is determined in operation 408 that the query is a Put query. Operation 424 depicts determining whether the application is authorized for Put queries. In embodiments, operation 424 may be implemented in a similar manner as operation 414, but with Put queries rather than Get queries. Where it is determined in operation 424 that the application is authorized for Put queries, the operating procedures of FIG. 4 move to operation 426. Where it is determined in operation 424 that the application is not authorized for Put queries, the operating procedures of FIG. 4 move to operation 432.

Operation 426 is reached from operation 424, where it is determined in operation 424 that the application is authorized for Get queries. Operation 426 depicts determining whether the query term identifies a key in the database. For example, the Put query may include a query term that is a hashed version of the user's current password (possibly in combination with the corresponding user name). Operation 426 may comprise determining whether this query term identifies a key in the database—whether the supplied credentials identify a pre-existing user account—so that a user can change or reset his/her password only when he/she can prove that he/she has the current password. (There may be other embodiments where password resetting is permitted in cases where a user has forgotten his/her password, but can otherwise prove his/her identity, such as by answering biographical questions.) Where it is determined in operation 426 that the query term identifies a key in the database, the operating procedures of FIG. 4 move to operation 428. Where it is determined in operation 424 that the query term does not identify a key in the database, the operating procedures of FIG. 4 move to operation 430.

Operation 428 is reached from operation 426, where it is determined in operation 426 that the query term identifies a key in the database. Operation 428 depicts creating a row. This row may comprise a term of the query that comprises a hash of the user name and the new password, and may be inserted into the database, or table of the database, where user passwords are stored for the corresponding application. After operation 428, the operating procedures of FIG. 4 move to operation 440, where the operating procedures of FIG. 4 end.

Operation 430 is reached from operation 426, where it is determined in operation 426 that the query term does not identify a key in the database. Operation 430 depicts returning an indication that there are no records matching the key to the application. For example, this may comprise returning the Boolean False to the application along with an identification of the query that is being referenced. After operation 430, the operating procedures of FIG. 4 move to operation 440, where the operating procedures of FIG. 4 end.

Operation 432 is reached from operation 424, where it is determined in operation 424 that the application is not authorized for Put queries. Operation 432 depicts raising an error. In embodiments, operation 432 may be implemented in a similar manner as operation 422. After operation 432, the operating procedures of FIG. 4 move to operation 440, where the operating procedures of FIG. 4 end.

Operation 434 is reached from operation 410 where is determined that the query is to change a password. Operation 434 depicts changing the password. In embodiments, operation 434 may be implemented in a similar manner as the operating procedures of FIG. 5 or 6. After operation 434, the operating procedures of FIG. 4 move to operation 440, where the operating procedures of FIG. 4 end.

Operation 436 is reached from operation 412 where is determined that the query is for a query, scan, wildcard operation, or the like. Operation 436 depicts raising an error. In embodiments, this may comprise sending an indication to the entity that issued the query that the query will not be processed, and logging the query attempt. After operation 436, the operating procedures of FIG. 4 move to operation 440, where the operating procedures of FIG. 4 end.

Operation 438 is reached from operation 412 where is determined that the query is not for a query, scan, wildcard operation, or the like. This may indicate that the query is not recognized, or otherwise unsupported. Operation 436 depicts raising an error. In embodiments, this may comprise sending an indication to the entity that issued the query that the query is not recognized and is otherwise unsupported, and logging the query attempt. After operation 436, the operating procedures of FIG. 4 move to operation 440, where the operating procedures of FIG. 4 end.

Figure 5:
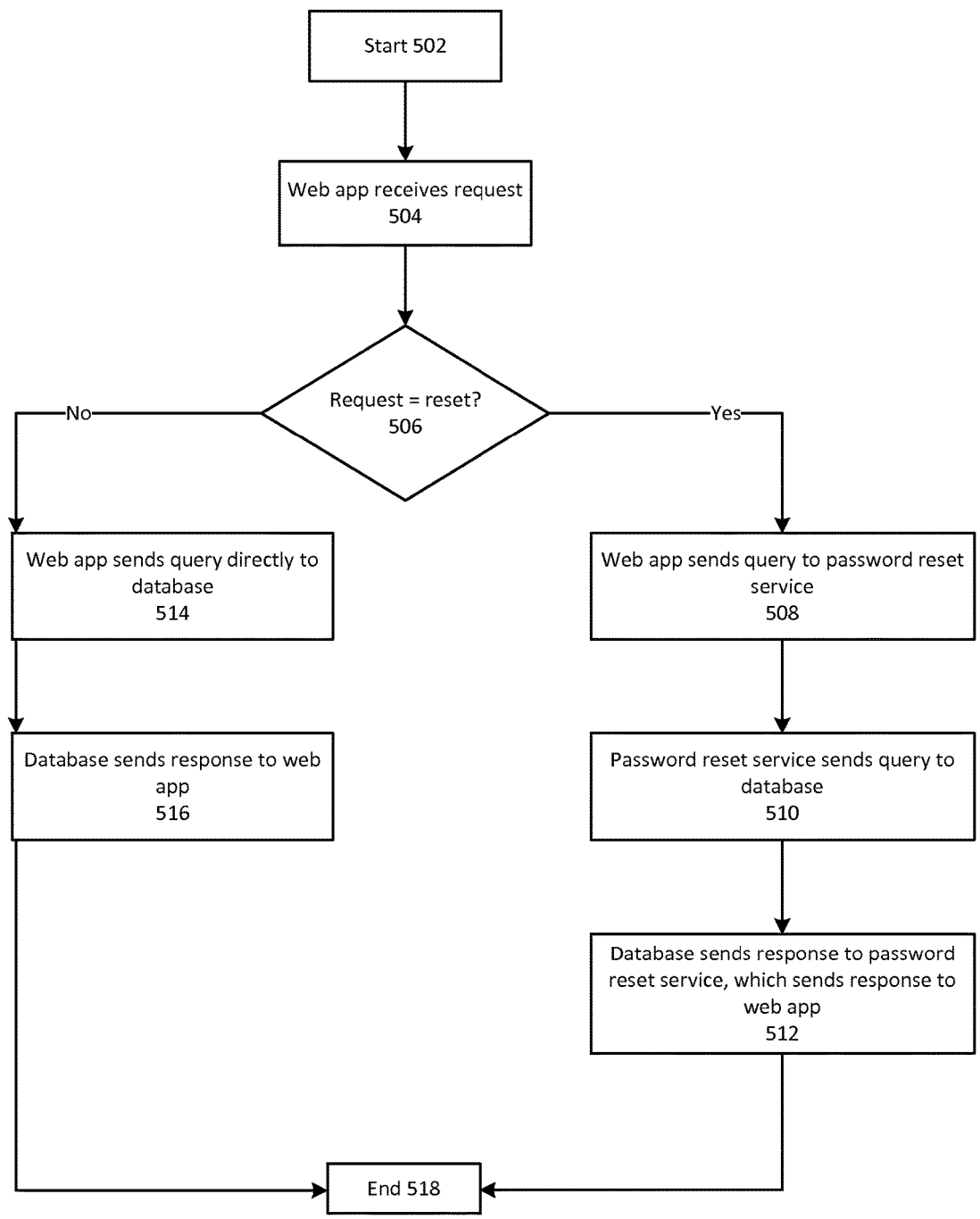
FIG. 5 depicts example operating procedures for an application sending a query to a database, where the application routes a password reset query through a password reset service.

FIG. 5 depicts example operating procedures for an application sending a query to a database, where the application routes a password reset query through a password reset service. In embodiments, the operating procedures of FIG. 5 may be implemented by an application executing on VM instance 114A of FIG. 1 as it queries database 116 via password reset service 122. In embodiments, the operating procedures of FIG. 5 may comprise sending, by an application, a query indicative of a password reset to an intermediary process, the intermediary process having access to direct the database to reset passwords, and the application lacking access to direct the database to reset passwords.

The operating procedures of FIG. 5 begin with operation 502 and move to operation 504. Operation 504 depicts an application receiving a request from a user that involves the user's credentials. In embodiments this may comprise receiving data across Internet 104 from customer computer A 102A, where customer computer A 102A had received local user input at a user interface that identified the user's credentials and that a request regarding those credentials was to be made to a corresponding web application. After operation 504, the operating procedures of FIG. 5 move to operation 506.

Operation 506 depicts determining whether the request from the user is a request to reset the user's password. In embodiments where requests are received via URLs, this may comprise an identification of a reset request in a query string of the URL. For example, the application may be located at http://example.com, and the request may take the form of customer computer A 102A attempting to access the URL http://example.com/?request=PwdReset, where "request=" indicates that the next part of the URL will identify the type of request being made and "PwdReset" identifies that the type of request being made is a password reset. Where it is determined in operation 506 that the request from the user is a request to reset the user's password, the operating procedures of FIG. 5 move to operation 508. Instead, where it is determined in operation 506 that the request from the user is not a request to reset the user's password, the operating procedures of FIG. 5 move to operation 514.

Operation 508 is reached from operation 506, where it is determined in operation 506 that the request from the user is a request to reset the user's password. Operation 508 depicts the application sending a query to the password reset service. This query may be similar to the Put query described in operation 408 of FIG. 4. It may be that the application is not authorized to perform password resets/Put queries on the database for security reasons. So, to allow for password resets, there may be a password reset service that is authorized to perform Put queries on the database. This password reset service may be limited to this function and may be designed to be more secure than other components. In this manner, password resets may be allowed, while limiting them to coming to the database from the password reset service, which is designed in a way to minimize the vulnerability created by allowing for Put queries. After operation 508, the operating procedures of FIG. 5 move to operation 510.

Operation 510 depicts the password reset service sending the query to the database. In embodiments, this may comprise forwarding the query to the database. In other embodiments, this may comprise transforming the query into a different format before forwarding the query to the database. For example, the password reset service may receive the password reset request from the application in the form of a URL, such as described with respect to operation 506. Where the database is not configured to process password reset requests formed in this manner, the password reset service may transform the information in this URL to a database query in a format that the database is configured to process. After operation 510, the operating procedures of FIG. 5 move to operation 512.

Operation 512 depicts the database sending the response to the password reset service, which in turn sends the response to the application. In embodiments, this may comprise an indication of whether or not the password reset was successful. In embodiments, the password reset service may transform the response from a format presented by the database to a format that the application is configured to process before forwarding the response to the application. In other embodiments, the database may send the response directly to the application because the security concern is with the database access itself that comes from whether the application may send the query in the first place, rather than with the response returned from a query that is allowed to be processed. After operation 512, the operating procedures of FIG. 5 move to operation 518 where the operating procedures of FIG. 5 end.

Operation 514 is reached from operation 506, where it is determined in operation 506 that the request from the user is not a request to reset the user's password. Operation 514 depicts the application sending the query directly to the database. In embodiments, this may be implemented similar to the operations of FIG. 4, where the application sends queries to the database. It may be that queries aside from password-reset queries may either be directly sent from the application (because they have a correspondingly lower likelihood of being exploited by an attacker), or they are disallowed for the application altogether, such as scan queries; (because their likelihood of being exploited may be great enough that they are uniformly disallowed for the application). In such a situation, these queries, such as Get queries, may be directly sent from the application to the database without intervention by the password reset service. After operation 514, the operating procedures of FIG. 5 move to operation 516.

Operation 516 depicts the database sending a response to the application. In embodiments, this may be implemented in a similar manner as described with respect to query responses in the operating procedures of FIG. 4. After operation 516, the operating procedures of FIG. 5 move to operation 518, where the operating procedures of FIG. 5 end.

Figure 6:
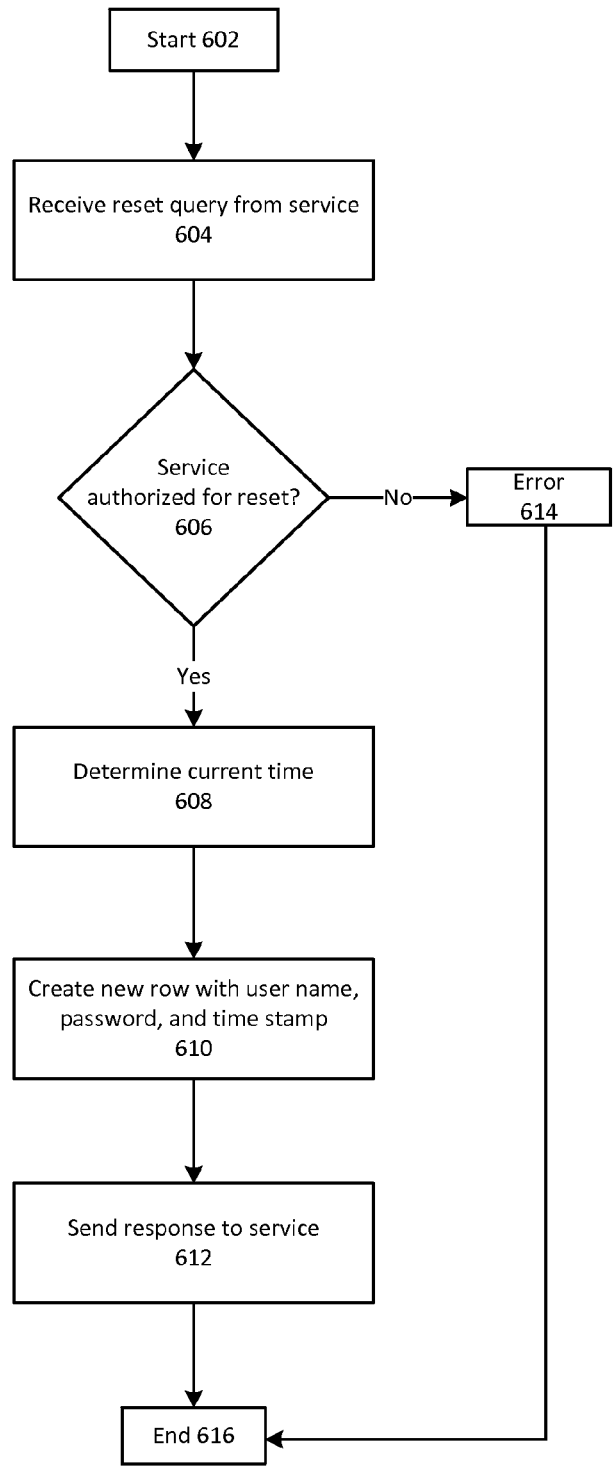
FIG. 6 depicts example operating procedures for a database implementing password resets, where the application sends password reset queries directly to the database.

FIG. 6 depicts example operating procedures for a database implementing password resets, where the application sends password reset queries directly to the database. The operating procedures of FIG. 6 may be contrasted to those of FIG. 5, where password reset queries are sent by an application to a database via a password reset service. In embodiments, the operating procedures of FIG. 6 may be implemented by database 116 of FIG. 1 as it receives queries from an application executing on VM instance 114A. In embodiments, the operating procedures of FIG. 6 may comprise sending a query indicative of a password reset to the database, the database processing the second query by creating a new row in the database indicative of the user name and a time stamp, the database maintaining a prior row indicative of the user name and a second time stamp that is older than the time stamp.

The operating procedures of FIG. 6 begin with operation 602 and move to operation 604. Operation 604 depicts receiving a reset query from the application. In embodiments, operation 604 may be implemented in a similar manner as operation 404 of FIG. 4. After operation 604, the operating procedures of FIG. 6 move to operation 606.

Operation 606 depicts determining whether the application is authorized for reset queries. In embodiments, operation 606 may be implemented in a similar manner as operation 414 of FIG. 4, where a password reset query is substituted for a Get query. Where it is determined in operation 606 that the application is authorized for reset queries, the operating procedures of FIG. 6 move to operation 608. Instead, where it is determined in operation 606 that the application is not authorized for reset queries, the operating procedures of FIG. 6 move to operation 614.

Operation 608 is reached from operation 606, where it is determined in operation 606 that the application is authorized for reset queries. Operation 608 depicts determining the most recent time. For instance, database 116 may have access to a clock or other time keeper that keeps track of the current time and uses the current time as the most recent time. It may be that the time tracked is the "wall clock" time (e.g., Jun. 4, 2014, at 2:17 PM PDT) or that the time being tracked is tracked relative to some event (e.g., 1,023,325 seconds elapsed since the database was created). After operation 608, the operating procedures of FIG. 6 move to operation 610.

Operation 610 depicts creating a new row in the database with the user name, password, and time stamp. In embodiments, operation 610 may be implemented in a similar manner as operation 426 of FIG. 4. The time stamp may be the most recent time determined in operation 608, and may be stored as a value or column in the row that is separate from, for example, a hash of the user name and password. After operation 610, the operating procedures of FIG. 6 move to operation 612.

Operation 612 depicts the database sending a response to the application. In embodiments, this response may comprise the Boolean TRUE or another indication that the password was successfully reset (by virtue of the new row having been created), so that the application is aware of whether or not the operation was carried out. After operation 612, the operating procedures of FIG. 6 move to operation 616, where the operating procedures of FIG. 6 end.

Operation 614 is reached from operation 606, where it is determined in operation 606 that the application is not authorized for reset queries. Operation 614 depicts raising an error. In embodiments, operation 614 may be implemented in a similar manner as operation 422 of FIG. 4. After operation 614, the operating procedures of FIG. 6 move to operation 616, where the operating procedures of FIG. 6 end.

Figure 7:
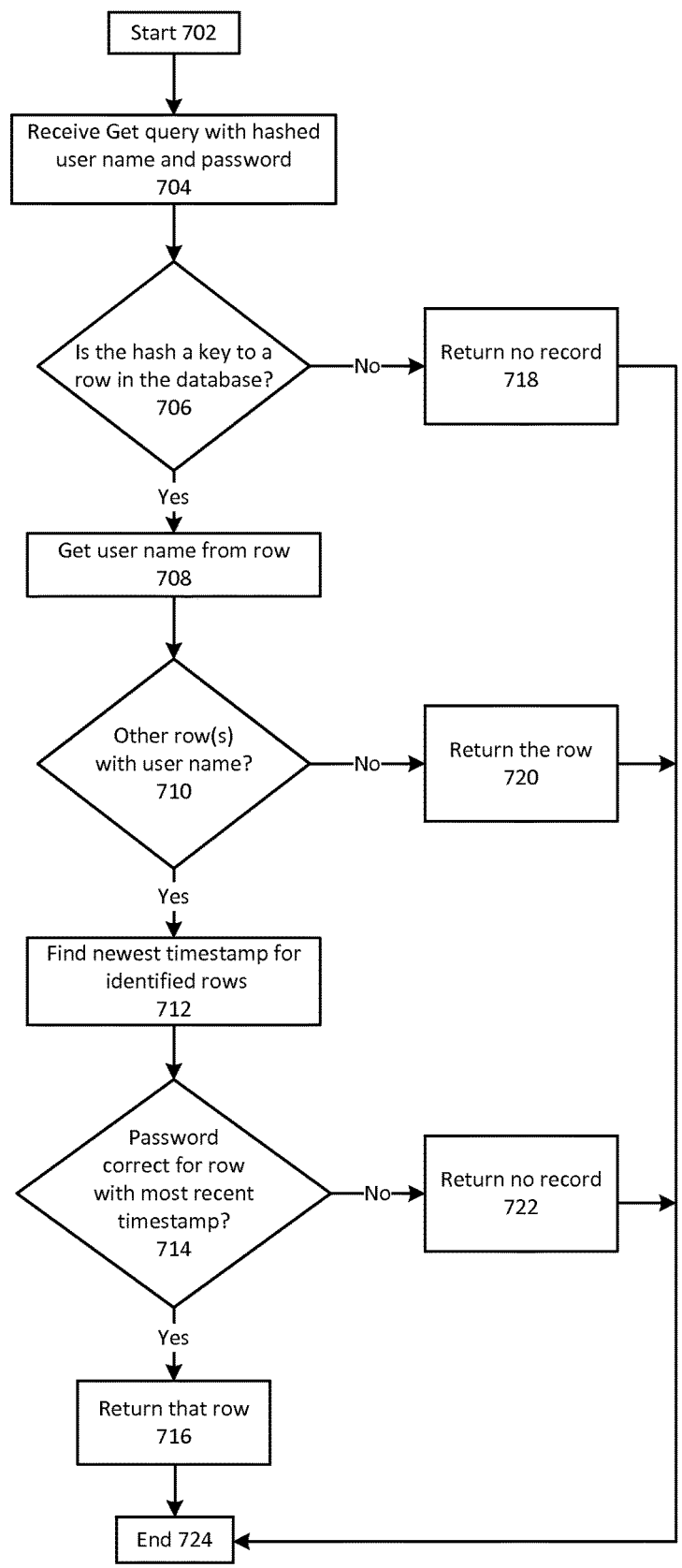
FIG. 7 depicts example operating procedures for a database implementing Get queries, where the database handles password resets and changes via creating new rows.

FIG. 7 depicts example operating procedures for a database implementing Get queries, where the database handles password resets and changes via creating new rows. The operating procedures of FIG. 7 may be considered in concert with the operating procedures of FIG. 6. The operating procedures of FIG. 6 involve an application directly sending a password reset to a database, where the database implements password resets or changes via time stamps on rows (with a reset password being represented by a new row for the user with a more recent time stamp). Then, the operating procedures of FIG. 7 involve validating a user's credentials where the database implements password resets or changes via time stamps on rows. In embodiments, the operating procedures of FIG. 7 may be implemented by database 116 of FIG. 1 as it receives queries from an application executing on VM instance 114A.

The operating procedures of FIG. 7 begin with operation 702 and move to operation 704. Operation 704 depicts receiving a Get query with a hashed user name and password. In embodiments, operation 704 may be implemented in a similar manner as operation 404 of FIG. 4. After operation 704, the operating procedures of FIG. 7 move to operation 706.

Operation 706 depicts determining whether the hash is a key to a row in the database. In embodiments, operation 706 may be implemented in a similar manner as operation 406 of FIG. 4, where the hash is the query term of the Get query. Where it is determined in operation 706 that the hash is a key to a row in the database, the operating procedures of FIG. 7 move to operation 708. Instead, where it is determined in operation 706 that the hash is not a key to a row in the database, the operating procedures of FIG. 7 move to operation 718.

Operation 708 is reached from operation 706, where it is determined in operation 706 that the hash is a key to a row in the database. Operation 708 depicts getting the user name from the row. There may be embodiments where the hash is a hash of the user name and of the password, and also the user name is separately stored in the row so that it may be individually accessed (it may be that the user name is not easily discernable based on the hash of the user name and password). In such embodiments, operation 708 may comprise accessing the user name in a column of a row that has a key that matches the hash. After operation 708, the operating procedures of FIG. 7 move to operation 710.

Operation 710 depicts determining whether there are any other row(s) in the database with the user name. Multiple rows may have the same user name where the user has changed or reset his password (one row for creating the account, then another row each time the password is changed). In this scenario, operation 710 may then comprise scanning the database for rows where the column that stores the user name has the same user name as identified in operation 708. Where it is determined in operation 710 that there are any other row(s) in the database with the user name, the operating procedures of FIG. 7 move to operation 712. Instead, where it is determined in operation 710 that there is no other row in the database with the user name, the operating procedures of FIG. 7 move to operation 720.

Operation 712 depicts finding the newest time stamp for the identified rows. This may comprise comparing each of the time stamps for the rows with the same user name that were identified in operation 710, and determining which one has the most recent time stamp. This row with the most recent time stamp may be the row with the current password (since the row was created to give the user a new password). After operation 712, the operating procedures of FIG. 7 move to operation 714.

Operation 714 depicts determining whether the password is correct for the row with the most recent timestamp. This may comprise, for example, comparing a hashed user name and password provided as a query term in the Get query to a key for the row, and determining that the password is correct where these two values match. Where it is determined in operation 714 that the password is correct for the row with the most recent timestamp, the operating procedures of FIG. 7 move to operation 716. Instead, where it is determined in operation 714 that the password is incorrect for the row with the most recent timestamp, the operating procedures of FIG. 7 move to operation 722.

Operation 716 is reached from operation 714, where it is determined in operation 714 that the password is correct for the row with the most recent timestamp. Operation 716 depicts returning the row with the most recent timestamp. In embodiments, operation 716 may be implemented in a similar manner as operation 418 of FIG. 4. After operation 716, the operating procedures of FIG. 7 move to operation 724, where the operating procedures of FIG. 7 end.

Operation 718 is reached from operation 706, where it is determined in operation 706 that the hash is not a key to a row in the database. Operation 718 depicts returning no record. In embodiments, operation 718 may be implemented in a similar manner as operation 420 of FIG. 4. After operation 718, the operating procedures of FIG. 7 move to operation 724, where the operating procedures of FIG. 7 end.

Operation 720 is reached from operation 710, where it is determined in operation 710 that there is no other row with the user name in the database. This may be because the user account's password has never been reset or otherwise changed since the password's creation (with each password modification involving the creation of a new row). Operation 720 depicts returning the row. In embodiments, operation 720 may be implemented in a similar manner as operation 716. After operation 720, the operating procedures of FIG. 7 move to operation 724, where the operating procedures of FIG. 7 end.

Operation 722 is reached from operation 714, where it is determined in operation 714 that the password is incorrect for the row with the most recent timestamp. Operation 718 depicts returning no record. In embodiments, operation 722 may be implemented in a similar manner as operation 718. After operation 722, the operating procedures of FIG. 7 move to operation 724, where the operating procedures of FIG. 7 end.

Figure 8:
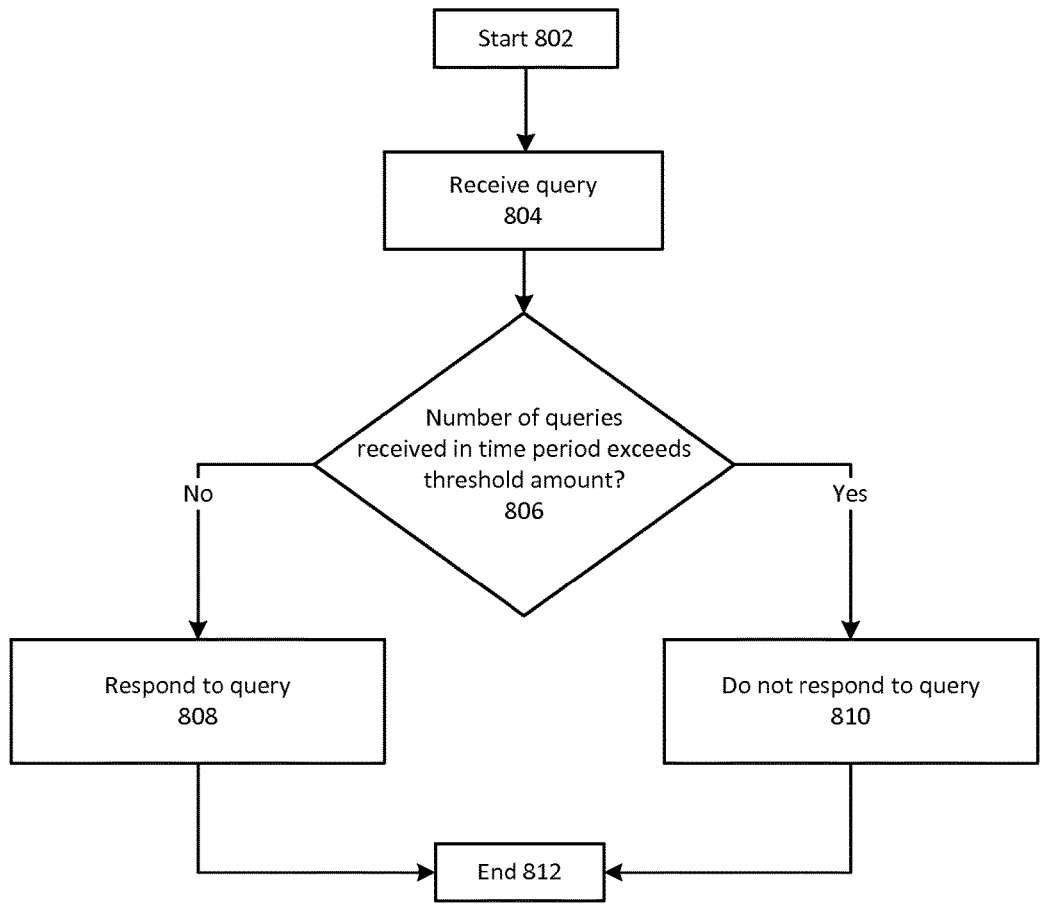
FIG. 8 depicts example operating procedures for limiting a rate of queries.

FIG. 8 depicts example operating procedures for limiting a rate of queries. The operating procedures of FIG. 8 may be implemented by database 116 of FIG. 1 to limit the rate of queries processed from an application executing on VM instance 114A. Limiting a rate of queries may be used to mitigate against "online attacks," where an attacker repeatedly queries the database with guesses for a password for a user account in the hopes that one guess is correct.

The operating procedures of FIG. 8 begin with operation 802 and move to operation 804. Operation 804 depicts receiving a query. In embodiments, operation 804 may be implemented in a similar manner as operation 404 of FIG. 4. After operation 804, the operating procedures of FIG. 8 move to operation 806.

Operation 806 depicts determining whether the number of queries received in a time period exceeds a threshold amount. This may comprise maintaining a list of queries along with a corresponding time at which each query was received. Then, when a new query is received, the list may be scanned to determine the number of queries made within the most recent time period (e.g., five minutes or two hours); that number is then compared against a threshold amount that represents a maximum number of queries permitted in that time period (e.g., 50 queries in five minutes). In embodiments, this threshold amount may be set by a policy of access manager 120. Where it is determined in operation 806 that the number of queries received in the time period exceeds the threshold amount, the operating procedures of FIG. 8 move to operation 810. Instead, where it is determined in operation 806 that the number of queries received in the time period does not exceed the threshold amount, the operating procedures of FIG. 8 move to operation 808.

Operation 808 is reached from operation 806, where in operation 806 it is determined that the number of queries received in the time period does not exceed the threshold amount. Operation 808 depicts responding to the query. This may comprise, for example, performing operations 406 through 440 of FIG. 4 (based on where the logical branching flows from operation 406), where those operations involve a database identifying and processing a query received from an application. After operation 808, the operating procedures of FIG. 8 move to operation 812 where the operating procedures of FIG. 8 end.

Operation 810 is reached from operation 806, where in operation 806 it is determined that the number of queries received in the time period exceeds the threshold amount. Operation 810 depicts not responding to the query. In embodiments, this may comprise failing to respond to the application relating to the query. In other embodiments, the database may return a response to the application that identifies that the query will not be processed because a rate threshold has been exceeded for the application. And in other embodiments, where the rate limit is exceeded, the database may respond to the query, but delay the response until the rate limit is no longer being exceeded for the current time period. In this manner, all queries may still be responded to, though online attacks will be mitigated, because the response to the queries will be slowed down, so the throughput of guesses the attacker may make is slowed down. Similarly, in embodiments, there may be a finite number of queued queries to be responded to, so that an attacker cannot attempt to overload the database's storage space for queued queries—when the queue is full and another query is received, that new query may be disregarded or dropped from the queue and not processed (or the oldest query in the queue may be disregarded and not processed, while a new query may be added to the queue, and therefore maintains the queue size). After operation 810, the operating procedures of FIG. 8 move to operation 812 where the operating procedures of FIG. 8 end.

Figure 9:
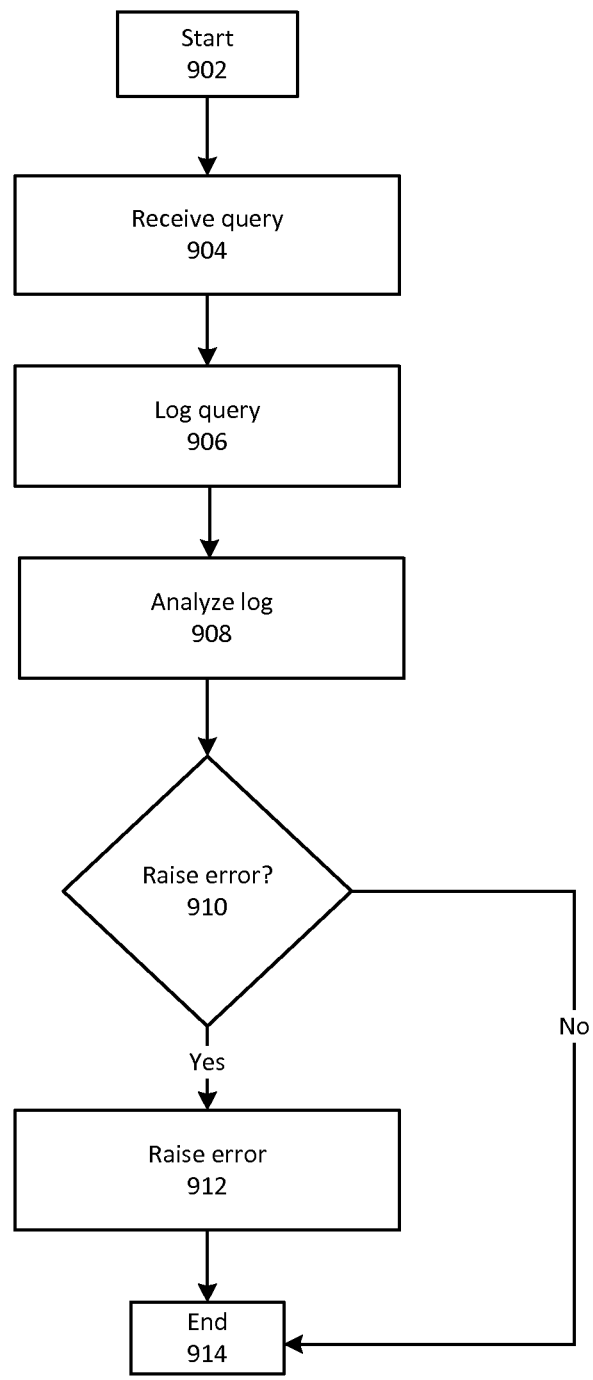
FIG. 9 depicts example operating procedures for logging and analyzing queries to the database.

FIG. 9 depicts example operating procedures for logging and analyzing queries to the database. The operating procedures of FIG. 9 may be implemented by database 116 of FIG. 1 to log the queries processed from an application executing on VM instance 114A. These queries may be logged and analyzed to determine whether they are indicative of an attacker trying to compromise user account information (such as passwords) stored in the database.

The operating procedures of FIG. 9 begin with operation 902 and then move to operation 904. Operation 904 depicts receiving a query. In embodiments, operation 904 may be implemented in a similar manner as operation 404 of FIG. 4. After operation 904, the operating procedures of FIG. 9 move to operation 906.

Operation 906 depicts logging the query. This may comprise storing the query itself, along with a time at which the query was received, and a source that originated the query (such as an application executing on VM instance 114A). This may also comprise storing a result returned in response to the query. This information may be stored, for example, in object-level storage 118 of FIG. 1. In embodiments, operation 906 comprises the database storing an identification of the query, an entity that originated the query, a result of processing the query, or a time associated with the query in a data store. After operation 906, the operating procedures of FIG. 9 move to operation 908.

Operation 908 depicts analyzing the logged queries. This act of analyzing the logged queries may be done to determine if there is data in the logged queries indicative of an attack. For example, the logged queries may be analyzed to determine that a rate of incorrect login attempts is above a threshold rate or a historical average, or that a ratio of incorrect login attempts to correct login attempts is above a threshold amount or a historical average. Additionally, the logged queries may be analyzed to determine whether the attack was successful. For example, where there are multiple login attempts that are unsuccessful (where no record is returned in response to a Get query) followed by a login attempt that is successful (where a record is returned in response to a Get query), that may indicate that the attack was successful because the attacker successfully guessed the proper password for that user account. After operation 908, the operating procedures of FIG. 9 move to operation 910.

Operation 910 depicts determining whether to raise an error based on analyzing the logged queries. In embodiments, an error may be raised where some part of the analysis of the logged queries in operation 908 is indicative of an attack. Where it is determined in operation 910 to raise an error based on analyzing the logged queries, the operating procedures of FIG. 9 move to operation 912. Instead, where it is determined in operation 910 not to raise an error based on analyzing the logged queries, the operating procedures of FIG. 9 move to operation 914, where the operating procedures of FIG. 9 end.

Operation 912 is reached from operation 910, where it is determined in operation 910 to raise an error based on analyzing the logged entries. Operation 912 depicts raising an error. In embodiments, this error may be logged so that an administrator of the database can view the error in a user interface of an application used to administer the database. In other embodiments, raising an error may comprise texting, emailing, or otherwise notifying an administrator of the database of the error. In embodiments, operation 912 may comprise the database raising an alert when a current rate of queries deviates from a historical rate of queries beyond a predetermined threshold amount; the database raising an alert when a current rate of queries, for which there is no corresponding record in the database, deviates from a historical rate of queries, for which there is no corresponding record in the database beyond a predetermined threshold amount; or the database raising an alert indicative of a possibility that an attack succeeded when a current rate of queries deviates from a historical rate of queries beyond a threshold amount and at least one record was returned for the queries that make up the current rate of queries. After operation 912, the operating procedures of FIG. 9 move to operation 914, where the operating procedures of FIG. 9 end.

Figure 10:
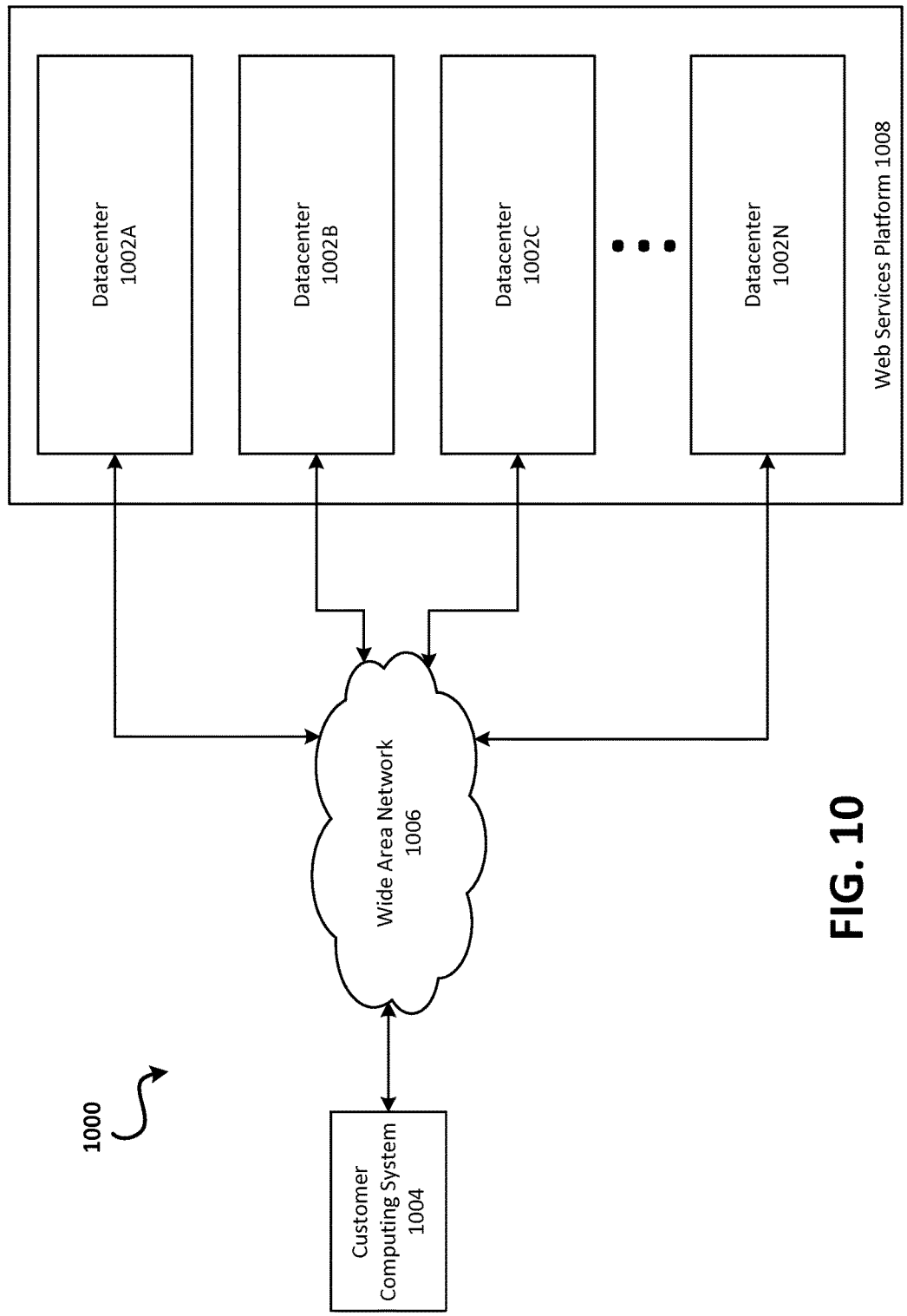
FIG. 10 depicts a web services platform, such as in FIG. 1, that comprises a plurality of datacenters.
Figure 11:
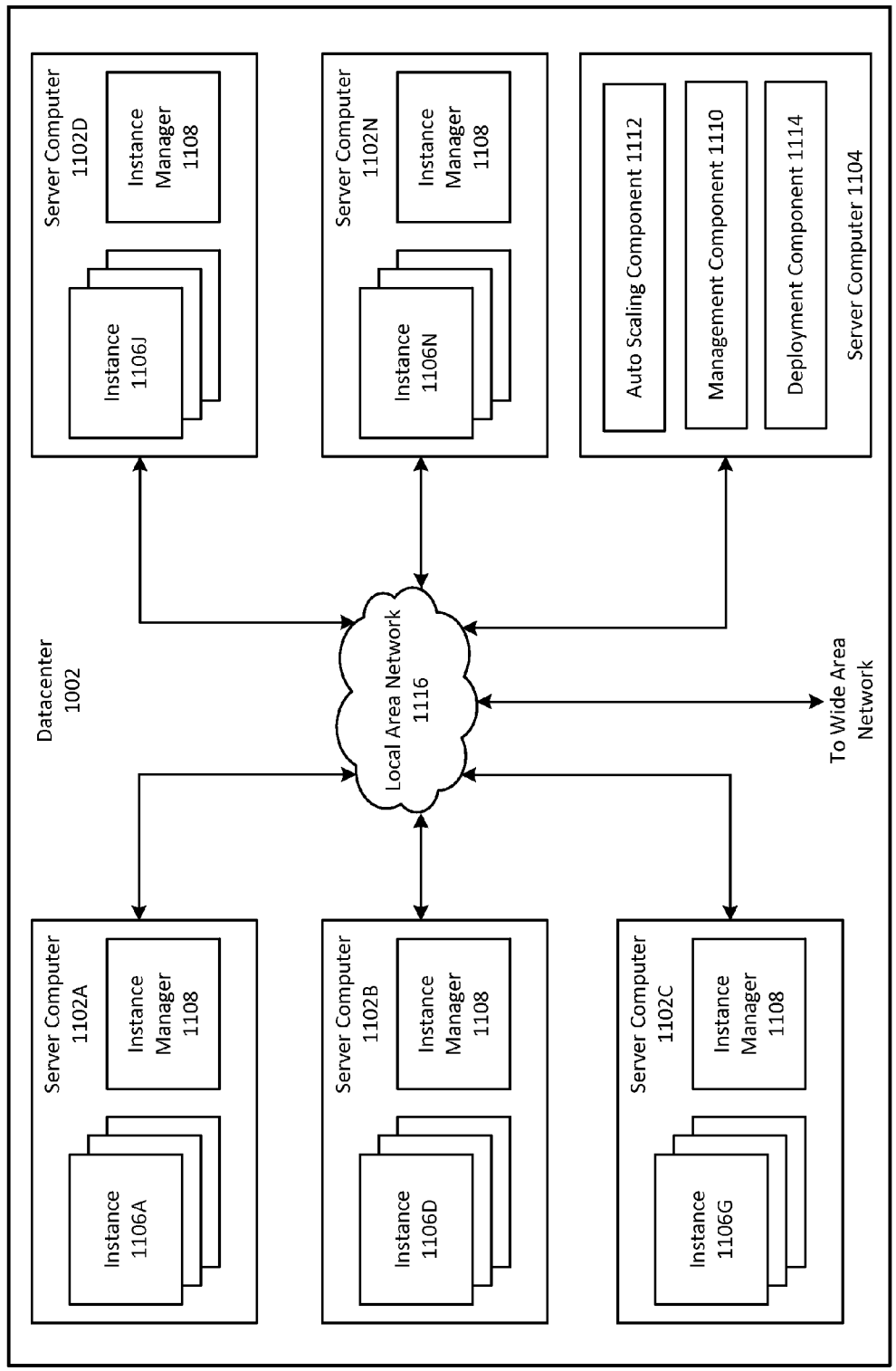
FIG. 11 depicts a datacenter, such as in FIG. 8, that comprises a plurality of computers.
Figure 12:
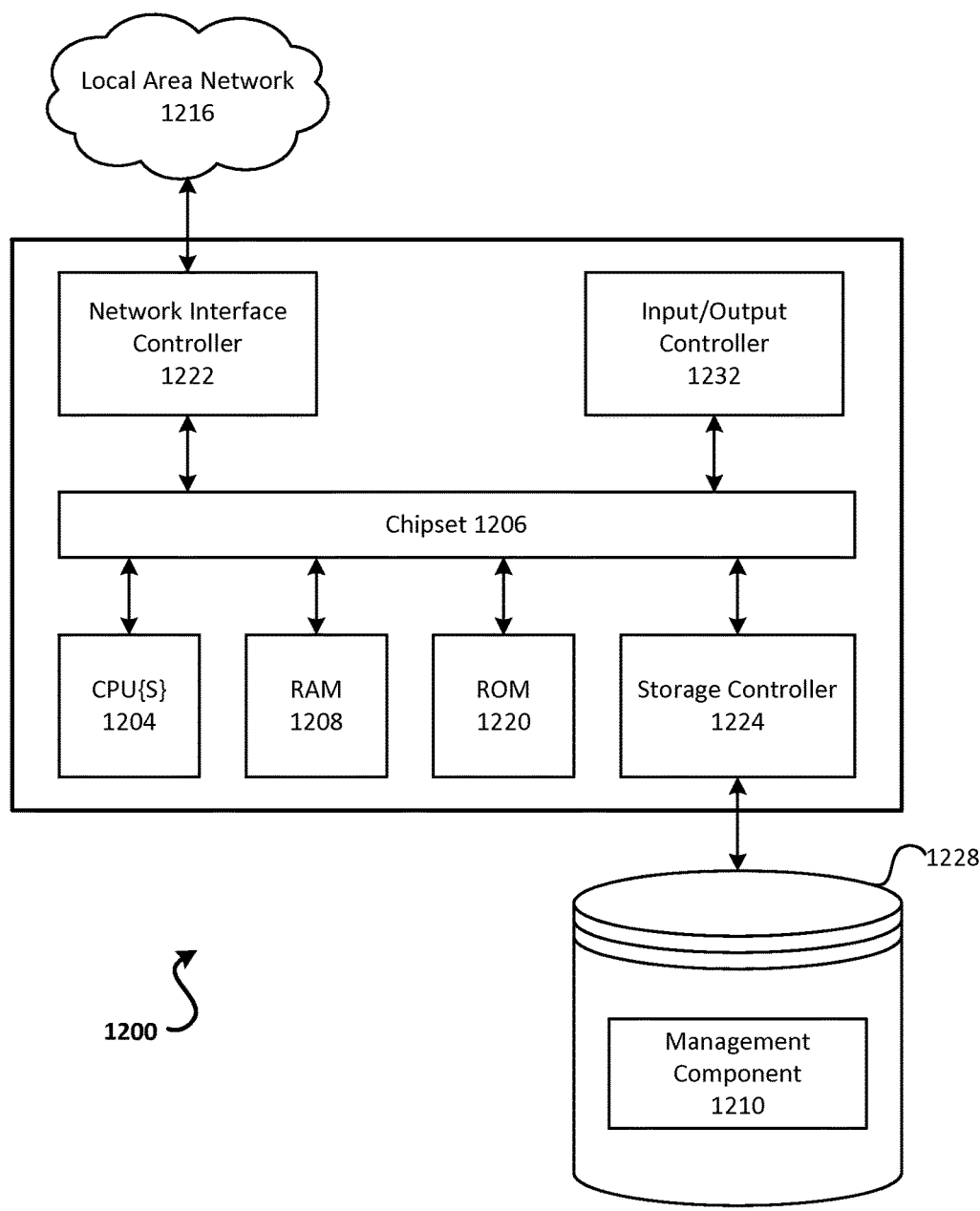
FIG. 12 depicts a computer that may be part of a datacenter, such as in FIG. 9.

FIGS. 10-12 are similar to FIG. 1 in that they depict example operating environments in which embodiments disclosed herein may be implemented, and said figures depict these operating environments at varying levels of granularity. FIG. 10 generally depicts a web services platform that comprises a plurality of datacenters. FIG. 11 generally depicts a datacenter that comprises a plurality of computers. FIG. 12 generally depicts a computer that may be part of a datacenter.

It may be appreciated that the operating environments of FIGS. 10-12 may be used to implement aspects of the operating environment of FIG. 1. For example, edge device 106, host computer 110, database 116, access manager 120, and password reset service 122 may be implemented in a datacenter 1002A of FIG. 10, or across multiple datacenters 1002A, 1002B, 1002C, and/or 1002N of FIG. 10. Likewise, customer computer A 102A and customer computer B 102B may each be customer computing system 1004 of FIG. 10.

Turning now to details of FIG. 10, this figure depicts an example of a suitable computing environment in which embodiments described herein may be implemented. A cloud service provider (such as web services platform 1008) may configure the illustrated computing environment to host virtual clouds of entities and to enable communication paths between these virtual clouds that may otherwise be isolated. In particular, FIG. 10 is a system and network diagram that shows an illustrative operating environment 1000 that includes a web services platform 1008 for implementing virtual clouds and for providing on-demand access to compute resources, such as virtual machine instances. Web services platform 1008 can provide compute resources for executing applications on a permanent or an as-needed basis and may be configured as a private network. These compute resources may include various types of resources, such as data processing resources, data storage resources, data communication resources, and the like. Each type of compute resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of compute resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The compute resources provided by web services platform 1008 may be enabled by one or more datacenters 1002A-1002N, which may be referred herein singularly as "datacenter 1002" or in the plural as "datacenters 1002." Datacenters 1002 may be facilities that house and operate computer systems and associated components and may include redundant and backup power, communications, cooling, and security systems. Datacenters 1002 may be located in a same geographical area, such as in a same facility, and may be interconnected using private networks, such as high-speed fiber optic networks, controlled and managed by a service provider of web services platform 1008. Datacenters 1002 may also be distributed across geographically disparate locations and may be interconnected in part using public networks, such as the Internet. One illustrative configuration for datacenter 1002 that implements the concepts and technologies disclosed herein is described below with regard to FIG. 11.

Entities of web services platform 1008 may access the compute resources provided by datacenters 1002 over a Wide Area Network (WAN) 1006. Although a WAN is illustrated in FIG. 10, it should be appreciated that a Local Area Network (LAN), the Internet, or any other networking topology known in the art that connects datacenters 1002 to remote entities and other users may be utilized. It should also be appreciated that combinations of such networks may also be utilized.

An entity or other entities that are customers of web services platform 1008 may utilize a computing system 1004 to access the compute resources provided by datacenters 1002. Customer computing system 1004 comprises a computer capable of accessing web services platform 1008, such as a server computer, a desktop or laptop personal computer, a tablet computer, a wireless telephone, a PDA, an e-reader, a game console, a set-top box, or any other computing node.

As is described in greater detail below, customer computing system 1004 may be utilized to configure aspects of the compute resources provided by web services platform 1008. In this regard, web services platform 1008 may provide a web interface through which aspects of its operation may be configured through the use of a web browser application program executing on customer computing system 1004. Alternatively, a stand-alone application program executing on customer computing system 1004 may access an application programming interface (API) exposed by web services platform 1008 for performing the configuration operations. Other mechanisms for configuring the operation of web services platform 1008, including launching new virtual machine instances on web services platform 1008, may also be utilized.

According to embodiments disclosed herein, capacities of purchased compute resources provided by web services platform 1008 can be scaled in response to demand. In this regard, scaling refers to the process of instantiating, which may also be referred to herein as "launching" or "creating," or terminating, which may also be referred to herein as "de-scaling," instances of compute resources in response to demand.

Web services platform 1008 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of compute resources.

FIG. 11 depicts a computing system diagram that illustrates one configuration for datacenter 1002 that implements web services platform 1008. With regards to elements of the web services platform 150 previously described with respect to FIG. 1, host computer 110 may be a server computer 1102 of FIG. 11 (which itself may be computer 1200 of FIG. 12), host partition 112 may be an instance of instance manager 1108 (where a host partition serves a hypervisor-type role), and VM instances 114A and 114B may each be an instance 1106 of FIG. 11. Database 116, access manager 120, and password reset service 122 of FIG. 1 may each be an instance of server computer 1104 of FIG. 11.

The example datacenter 1002 shown in FIG. 11 may include several server computers 1102A-1102N, which may be referred herein singularly as "server computer 1102" or in the plural as "server computers 1102," for providing compute resources for hosting virtual clouds and for executing applications. Server computers 1102 may be standard tower or rack-mount server computers configured appropriately for providing the compute resources described above. For instance, in one implementation server computers 1102 may be configured to provide instances 1106A-1106N of compute resources.

Instances 1106A-1106N, which may be referred herein singularly as "instance 1106" or in the plural as "instances 1106," may be virtual machine instances. As known in the art, a virtual machine instance is an instance of a software implementation of a machine (i.e., a computer) that executes programs like a physical machine. In the example of virtual machine instances, each server 1102 may be configured to execute an instance manager 1108 capable of executing the instances. Instance manager 1108 may be a hypervisor or another type of program configured to enable the execution of multiple instances 1106 on a single server 1102, for example. As discussed above, each of instances 1106 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 1002 shown in FIG. 11 may also include a server computer 1104 reserved for executing software components for managing the operation of datacenter 1002, server computers 1102, and instances 1106. In particular, server computer 1104 may execute a management component 1110. As discussed above, working between FIGS. 10 and 11, an entity of web services platform 1008 may utilize customer computing system 1004 to access management component 1110 to configure various aspects of the operation of web services platform 1008 and instances 1106 purchased by the entity. For example, the entity may purchase instances and make changes to the configuration of the instances. The entity may also specify settings regarding how the purchased instances are to be scaled in response to demand. The entity may also provide requests to launch instances to management component 1110.

As also described briefly above, an auto scaling component 1112 may scale instances 1106 based upon rules defined by an entity of web services platform 1008. For example, auto scaling component 1112 may allow an entity to specify scale up rules for use in determining when new instances should be instantiated and scale down rules for use in determining when existing instances should be terminated.

As discussed briefly above, datacenter 1002 may also be configured with a deployment component 1114 to assist entities in the deployment of new instances 1106 of compute resources. Deployment component 1114 may receive a configuration from an entity that includes data describing how new instances 1106 should be configured. For example, the configuration may specify one or more applications that should be installed in new instances 1106, provide scripts and/or other types of code to be executed for configuring new instances 1106, provide cache warming logic specifying how an application cache should be prepared, and other types of information.

Deployment component 1114 may utilize the entity-provided configuration and cache warming logic to configure, prime, and launch new instances 1106. The configuration, cache warming logic, and other information may be specified by an entity using management component 1110 or by providing this information directly to deployment component 1114. Other mechanisms may also be utilized to configure the operation of deployment component 1114.

In the example datacenter 1002 shown in FIG. 11, an appropriate LAN 1116 may be utilized to interconnect server computers 1102A-1102N and server computer 1104. LAN 1116 may also be connected to WAN 1006 illustrated in FIG. 10. It should be appreciated that the network topology illustrated in FIGS. 10 and 11 has been greatly simplified and that many more networks and networking devices may be utilized to interconnect the various computing systems disclosed herein. Appropriate load balancing devices or software modules may also be utilized for balancing a load between each of datacenters 1002A-1002N, between each of server computers 1102A-1102N in each datacenter 1002 and between instances 1106 purchased by each entity of web services platform 1008. These network topologies and devices should be apparent to those skilled in the art.

It should be appreciated that datacenter 1002 described in FIG. 11 is merely illustrative and that other implementations may be utilized. In particular, functionality described herein as being performed by management component 1110, auto scaling component 1112, and deployment component 1114 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

FIG. 12 depicts an example computer architecture for a computer 1200 capable of executing the above-described software components. With regard to the example web services platform 150 described with respect to FIG. 1, host computer 110 and database 116, as well as customer computer A 102A and customer computer B 102B, may each be implemented in computer 1200 of FIG. 12.

The computer architecture shown in FIG. 12 illustrates a conventional server computer, workstation, desktop computer, laptop, tablet, network appliance, PDA, e-reader, digital cellular phone, or other computing node, and may be utilized to execute any aspects of the software components presented herein described as executing within datacenters 1002A-1002N, on server computers 1102A-1102N, on the customer computing system 1004, or on any other computing system mentioned herein.

Computer 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. CPUs 1204 may be standard programmable processors that perform arithmetic and logical operations necessary for the operation of computer 1200.

CPUs 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 1206 may provide an interface between CPUs 1204 and the remainder of the components and devices on the baseboard. Chipset 1206 may provide an interface to a random access memory (RAM) 1208 used as the main memory in computer 1200. Chipset 1206 may further provide an interface to a computer-readable storage medium, such as a read-only memory (ROM) 1220 or non-volatile RAM (NVRAM) (not shown), for storing basic routines that may help to start up computer 1200 and to transfer information between the various components and devices. ROM 1220 or NVRAM may also store other software components necessary for the operation of computer 1200 in accordance with the embodiments described herein.

Computer 1200 may operate in a networked environment using logical connections to remote computing nodes and computer systems through LAN 1216. Chipset 1206 may include functionality for providing network connectivity through a network interface controller (NIC) 1222, such as a gigabit Ethernet adapter. NIC 1222 may be capable of connecting the computer 1200 to other computing nodes over LAN 1216. It should be appreciated that multiple NICs 1222 may be present in computer 1200, connecting the computer to other types of networks and remote computer systems.

Computer 1200 may be connected to a mass storage device 1228 that provides non-volatile storage for the computer. Mass storage device 1228 may store system programs, application programs, other program modules, and data, which have been described in greater detail herein. Mass storage device 1228 may be connected to computer 1200 through a storage controller 1224 connected to chipset 1206. Mass storage device 1228 may consist of one or more physical storage units. Storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 1200 may store data on mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 1228 is characterized as primary or secondary storage and the like.

For example, computer 1200 may store information to mass storage device 1228 by issuing instructions through storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 1200 may further read information from mass storage device 1228 by detecting the physical states or characteristics of one or more particular locations within the physical storage units.

In addition to mass storage device 1228 described above, computer 1200 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 1200.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 1228 may store an operating system utilized to control the operation of the computer 1200. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 1228 may store other system or application programs and data utilized by computer 1200, such as management component 1210 and/or the other software components described above.

Mass storage device 1228 or other computer-readable storage media may also be encoded with computer-executable instructions, which, when loaded into computer 1200, transforms the computer from a general-purpose computing system into a special-purpose computer capable of implementing the embodiments described herein. These computer-executable instructions transform computer 1200 by specifying how CPUs 1204 transition between states, as described above. Computer 1200 may have access to computer-readable storage media storing computer-executable instructions, which, when executed by computer 1200, may perform operating procedures depicted in FIGS. 3-8.

Computer 1200 may also include an input/output controller 1232 for receiving and processing input from a number of input devices, such as a keyboard, a mouse, a touchpad, a touch screen, an electronic stylus, or other type of input device. Similarly, input/output controller 1232 may provide output to a display, such as a computer monitor, a flat-panel display, a digital projector, a printer, a plotter, or other type of output device. It will be appreciated that computer 1200 may not include all of the components shown in FIG. 12, may include other components that are not explicitly shown in FIG. 12, or may utilize an architecture completely different than that shown in FIG. 12.

As described herein, a computing node may be a physical computing node, such as computer 1200 of FIG. 12. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method, comprising:
   receiving a user name and password in connection with a request to access a resource;
   authenticating to a database associated with the resource using credentials associated with a policy, the policy being configured with respect to database queries such that database queries are allowed where they uniquely identify one result or no results;
   generating a value based at least in part on the user name and based at least in part on the password, the value differing from the user name, the value differing from the password;
   constructing a database query to look up an entry in the database, the database query including an indication of the value as a query term;
   sending, after the authenticating, the query to the database;
   receiving a response from the database that indicates whether the database contains a row that uses the value as a key for the row;
   determining that the user name and password are valid when the response from the database indicates that the database contains a row that uses the value as the key for the row; and
   providing access to the resource in response to determining that the user name and password are valid.

2. The computer-implemented method of claim 1, further comprising:
   generating a second value based at least in part on a second user name and a second password;
   sending a second database query to the database, the second database query including an indication of the second value as a query term;
   determining that the user name and password are invalid when a second response from the database indicates that the database lacks a row that uses the value as the key for the row, the database matching either uniquely matching one row or no rows based on a given key; and
   denying access to the resource in response to determining that the second user name and the second password are invalid.

3. A system, comprising:
   at least one processor; and
   at least one memory bearing processor executable instructions that, upon execution by the at least one processor, cause the system at least to:
   generate a value based at least in part on a user name and a password;
   authenticate to a database using credentials associated with a policy, the policy indicating that database queries are allowed where they uniquely identify one result or no results;
   construct a database query to look up an entry in the database, the database query including an indication of the value;
   send, after the authenticating, the query to the database;
   receive a response from the database that indicates whether the database contains a row that uses the value as a key for the row; and
   provide an indication that access to a resource is to be allowed based at least in part on whether the response from the database indicates whether the database contains the row that uses the value as the key for the row.

4. The system of claim 3, further comprising:
   the database.

5. The system of claim 3, further comprising:
   an access control component operable to inspect the query to determine whether the query is consistent with the policy, and to allow the query to proceed to the database where the query is consistent with the policy.

6. The system of claim 3, wherein the instructions that, upon execution by the at least one processor, cause the system at least to generate the value and construct the database query are performed by a web application, and wherein the at least one memory further bears instructions that, upon execution by the at least one processor, cause the system at least to:
   receive, by the web application, the user name and password from a remote computer across a communications network, the remote computer providing the user name and password as part of an attempt to log into the web application.

7. The system of claim 5, wherein the at least one memory further bears instructions that, upon execution by the at least one processor, cause the system at least to:
   in response to sending a second query to the database that involves a scan, enumerate, or wildcard operation on the database, fail to receive a response from the database indicative of the database having processed the second query.

8. The system of claim 3, wherein the database is configured to enforce a different policy between two services that query the database.

9. The system of claim 3, wherein the query is a Get query in a NoSQL database query format that omits a wildcard.

10. The system of claim 3, wherein the instructions that, upon execution by the at least one processor, cause the system at least to receive the response from the database further cause the system at least to:
    receive the response from the database based at least in part on the database determining that a threshold rate of queries has not been exceeded based on the policy.

11. The system of claim 10, wherein the at least one memory further bears instructions that, upon execution by the at least one processor, cause the system at least to:
receive a response to a second query sent to the database based at least in part on the database determining that the threshold rate of queries has been exceeded, the database delaying producing the response to the second query while the threshold rate of queries is exceeded, or the database having dropped a third query from a queue of queries to be processed based at least in part on adding the second query to the queue of queries to be processed.

12. The system of claim 3, wherein the at least one memory further bears instructions that, upon execution by the at least one processor, causes the system at least to:
receive a password reset request for the user name or a second user name; and
send, by an application, a second query indicative of a password reset to an intermediary process, the intermediary process having access to direct the database to reset passwords, the application lacking access to directly direct the database to reset passwords.

13. The system of claim 3, wherein the at least one memory further bears instructions that, upon execution by the at least one processor, causes the system at least to:
receive a password reset request for the user name or a second user name; and
send a second query indicative of a password reset to the database, the database processing the second query by creating a new row in the database indicative of the user name and a time stamp, the database maintaining a prior row indicative of the user name and a second time stamp that is older than the time stamp.

14. A non-transitory computer-readable storage medium bearing computer-executable instructions that, when executed on a computer, cause the computer to perform operations comprising:
generating a value based at least in part on a user name and a password;
authenticating to a database using credentials associated with a policy, the policy being configured with respect to database queries such that database queries are allowed where they uniquely identify one result or no results;
constructing a database query to look up an entry in the database, the database query including an indication of the value;
sending the query to the database;
receiving a response from the database that indicates whether the database contains a row that uses the value as a key for the row; and
providing an indication that access to a resource is to be allowed based at least in part on whether the response from the database indicates whether the database contains the row that uses the value as the key for the row.

15. The non-transitory computer-readable storage medium of claim 14, wherein sending the query to the database comprises:
sending the query to the database, the database storing an identification of the query, an entity that originated the query, a result of processing the query, or a time associated with the query in a data store.

16. The non-transitory computer-readable storage medium of claim 14, wherein sending the query to the database comprises:
sending the query to the database, the database raising an alert when a current rate of queries deviates from a historical rate of queries beyond a predetermined threshold amount.

17. The non-transitory computer-readable storage medium of claim 14, wherein sending the query to the database comprises:
sending the query to the database, the database raising an alert when a current rate of queries for which there is no corresponding record in the database deviates from a historical rate of queries for which there is no corresponding record in the database beyond a predetermined threshold amount.

18. The non-transitory computer-readable storage medium of claim 14, wherein sending the query to the database comprises:
Sending, after the authenticating, the query to the database, the database raising an alert indicative of a possibility that an attack succeeded when a current rate of queries deviates from a historical rate of queries beyond a threshold amount and at least one record was returned for the queries that make up the current rate of queries.

19. The non-transitory computer-readable storage medium of claim 14, further comprising:
sending a second query to the database, the second query including an indication of a second value;
receiving a second response from the database that indicates that the database contains no row that uses the second value as a key; and
in response to receiving the second response, denying access to the resource.

20. The non-transitory computer-readable storage medium of claim 14, wherein a plurality of applications utilize the database, and wherein constructing the database query comprises:
constructing, by a first application of the plurality of applications, the database query based at least in part on a second value that is independent of the user name and the password, and which is unique to the first application among the plurality of applications.

* * * * *